United States Patent [19]

Atalla

[11] 4,315,101
[45] Feb. 9, 1982

[54] METHOD AND APPARATUS FOR SECURING DATA TRANSMISSIONS

[75] Inventor: Martin M. Atalla, Atherton, Calif.

[73] Assignee: Atalla Technovations, San Jose, Calif.

[21] Appl. No.: 82,464

[22] Filed: Oct. 9, 1979

Related U.S. Application Data

[63] Continuation-in-part of Ser. No. 9,532, Feb. 5, 1979, Pat. No. 4,283,599, which is a continuation-in-part of Ser. No. 3,898, Jan. 16, 1979, Pat. No. 4,268,715, which is a continuation-in-part of Ser. No. 902,444, May 3, 1978, Pat. No. 4,281,215.

[51] Int. Cl.³ .................. H04L 9/00; H04Q 9/00; G06F 15/30
[52] U.S. Cl. .................. 178/22.08; 340/825.34; 235/379; 178/22.09
[58] Field of Search .................. 340/149 R, 149 A; 235/379, 380, 382; 178/22; 375/2

[56] References Cited

U.S. PATENT DOCUMENTS

| | | | |
|---|---|---|---|
| 3,956,615 | 5/1976 | Andeson et al. | 178/22 |
| 4,075,460 | 2/1978 | Gorgens | 340/149 A |
| 4,186,871 | 2/1980 | Andeson | 178/22 |
| 4,200,770 | 4/1980 | Hellman et al. | 178/22 |
| 4,218,738 | 8/1980 | Matyas et al. | 340/149 A |
| 4,234,932 | 11/1980 | Gorgens | 235/379 |

*Primary Examiner*—Howard A. Birmiel
*Attorney, Agent, or Firm*—A. C. Smith

[57] ABSTRACT

A method and apparatus are provided for improving the security of data transmissions between stations and for controlling secured transactions from remote locations in a data-transfer system. The method and apparatus obviate the need for transmitting user-identification information such as personal identification number (PIN) from station to station, e.g., from the station utilized by the user to enter his PIN and initiate a transaction, to the station that processes the transaction. Also, for added security, the method and apparatus provide for encryption (encoding) and decryption (decoding) of data during a transaction using encryption and decryption keys produced from different (independent) PIN's. The apparatus includes at least one irreversible algorithm module, a random number generator and at least one data file (e.g., disc or magnetic tape storage). The apparatus also includes a comparator or, alternatively, an encoding algorithm module and a matching decoding algorithm module. In addition, a data-transfer system obviates the need for paired encryption/decryption modules on a data link while nevertheless maintaining a high level of security in the data transferred. This facilitates remote control of data transfer between locations within the system, enables use of conventional data links, and permits convenient changes of and additions to the files of stored codes for the system without compromising the security of data transfers or of identifying codes for authorized individuals. An encoding center may be established which can be contacted by telephone and supplied with the PIN of a user and which can produce an encoding word that is received by the user via the telephone for his subsequent use in completing a telephone-oriented transaction.

2 Claims, 19 Drawing Figures

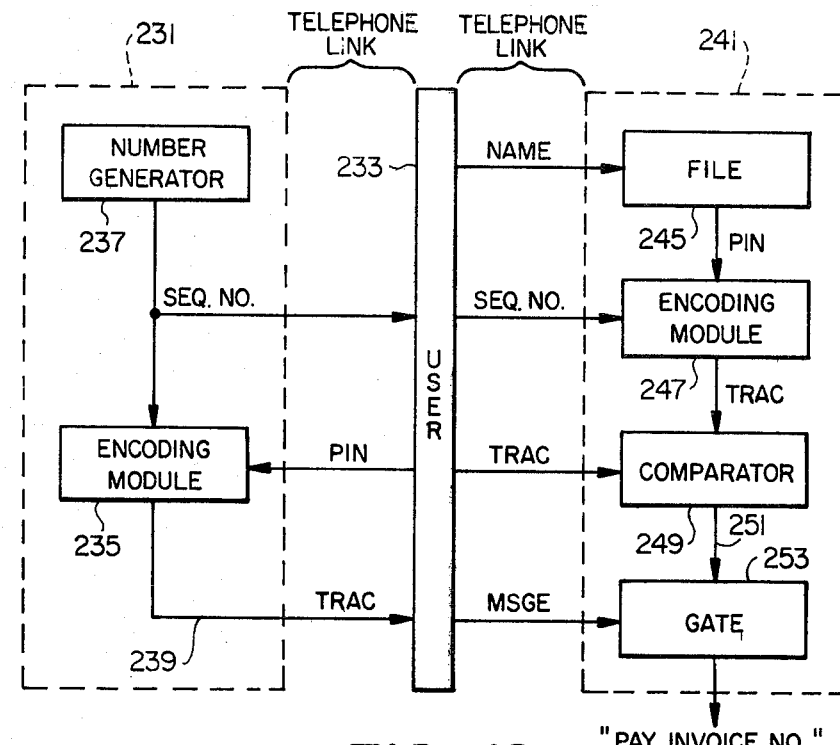
FIG_12
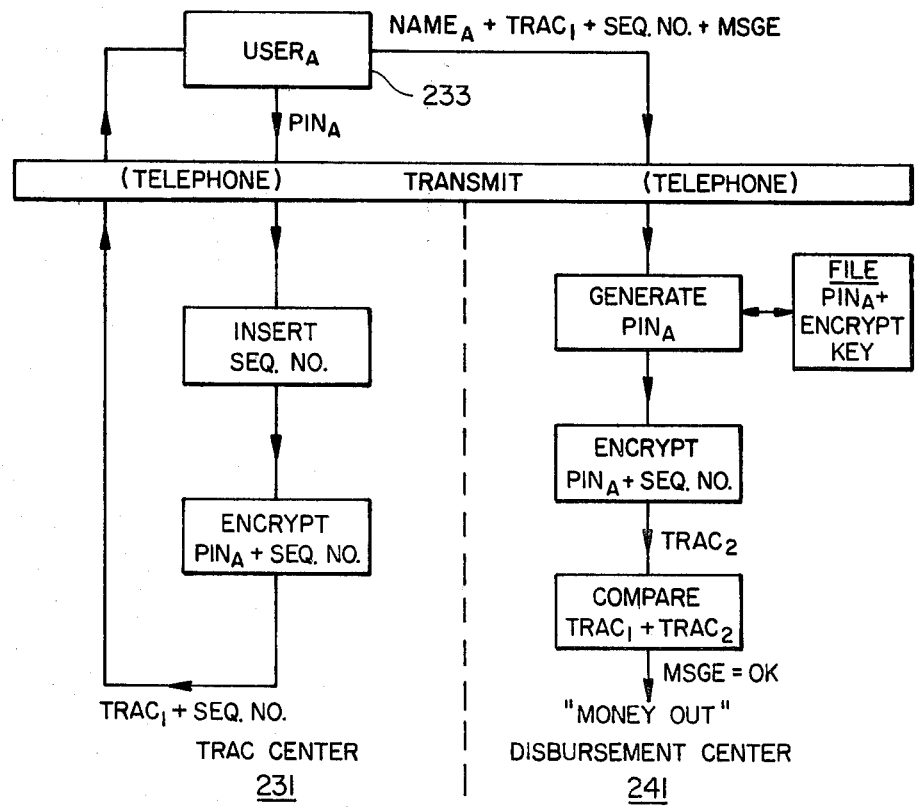
FIG_13

METHOD AND APPARATUS FOR SECURING DATA TRANSMISSIONS

CROSS-REFERENCE TO RELATED APPLICATIONS

This is a continuation-in-part application of pending application Ser. No. 009,532, U.S. Pat. No. 4,283,599 entitled Improved Method And Apparatus For Securing Data Transmissions, filed Feb. 5, 1979, which is a continuation-in-part application of pending application Ser. No. 003,898, U.S. Pat. No. 4,268,715 entitled Improved Method And Apparatus For Securing Data Transmissions, filed Jan. 16, 1979, which is a continuation-in-part application of pending application Ser. No. 902,444, U.S. Pat. No. 4,281,215 entitled Method And Apparatus For Securing Data Transmissions, filed May 3, 1978, by M. M. Atalla.

BACKGROUND OF THE INVENTION

Numerous methods and apparatus have been developed for transmitting messages in a secure manner between stations. Many of the methods and apparatus provide for coding of the message prior to transmission and for decoding of the message at its destination subsequent to transmission. Two such methods and apparatus are described, for example, in U.S. Pat. No. 3,711,645 issued Jan. 16, 1973, to Kurt Ehrat, entitled Method And Apparatus For Coding Messages, and in U.S. Pat. No. 3,956,615 issued May 11, 1976, to Thomas G. Anderson, William A. Boothroyd and Richard C. Frey, entitled Transaction Execution System With Secure Data Storage And Communications. A third method and apparatus is described, for example, in U.S. Pat. No. 3,938,091, issued Feb. 10, 1976, to Martin M. Atalla, entitled Personal Verification System.

A common feature of such apparatus is the use of fixed, predetermined encoding-decoding keys to encode and decode data, or the use of variable encoding keys transmitted with the encoded message to a destination station for processing (the variable encoding keys being supplied by the user, or generated by the apparatus from user-supplied information). At the destination station, the transmitted variable-key is utilized by a decoder of the apparatus to decode the encoded message.

Whereas the use of variable rather than fixed encoding-decoding keys would seem to provide a greater measure of security in message transmission than do fixed keys (especially variable keys supplied by a user or generated by the apparatus from user-supplied information), the practice of transmitting a variable key so that it can be used in the decoding process reduces the security of the operation because unauthorized users could conceivably gain access to the key during the transmission of the key. It would be desirable, therefore, in improving the security of such data transmission operations (especially bank transaction operations or the like which require not only secure transmission of data but also accurate identification of users) to use a technique which provides for secure transmissions of data without requiring transmission of matching encoding-decoding keys or of user-identification information. Also, it would be desirable in certain applications to obviate the need for dedicated pairs of matched encoders/decoders in order to enhance the flexibility of the data-transfer system and to reduce the start-up and changeover time inherent in placing conventional paired modules in the proper locations. In addition, it would be desirable to encrypt messages between specific persons or entities via an intermediate or central station which can function in a manner similar to a data switch that ties numerous entities together. Also, it would be desirable to establish a central location which users can contact by telephone for coded information that can then be used to authorize a telephone-oriented transaction (such as pay bills by telephone order).

SUMMARY OF THE INVENTION

In accordance with the illustrated preferred embodiment of the present invention, a method and apparatus are provided for improving security of data transmission between stations by making it unnecessary to transmit user-identification information between the stations. Also, to further improve security, an alternative method provides for encoding and decoding the data during each transaction, using encoding and decoding keys produced from different PIN's (Personal Identification Number entered into the apparatus by a user to initiate a transaction such as a bank deposit or withdrawal transaction). The apparatus includes at least one irreversible algorithm module, a random number generator, and at least one data file. The composite system embodiment of the present invention enables encoded data to be transferred by conventional data transmission means such as mail, voice transmission via telephone, radio, and the like, without loss of security associated with the transmitted data or the identifying code of an authorized user. Also, the system embodiment of the present invention facilitates the remote control of data-transfer operations between distant stations and permits changes of and additions to central files of identifying codes for authorized individuals from remote stations without compromising the security of the transmittion of such critical information. In addition, the system embodiment of the present invention enables messages in various formats to be transmitted in fully-secured, encrypted form between specified persons of entities via an intermediate or central station which can link any selected pair of numerous such entities. Also, a system embodiment of the present invention includes a central location which users can contact by telephone for requisite coding information based upon their PIN for use in completing telephone orders with respect to the user's account.

BRIEF DESCRIPTION OF THE DRAWINGS

FIG. 12 is a schematic diagram of an embodiment of the present invention in which a central location is established which users can contact via telephone for encoding information based upon their PIN; and FIG. 13 is a flow chart illustrating the operation of the embodiment of FIG. 12.

DESCRIPTION OF THE PREFERRED EMBODIMENT

Figure 1A:
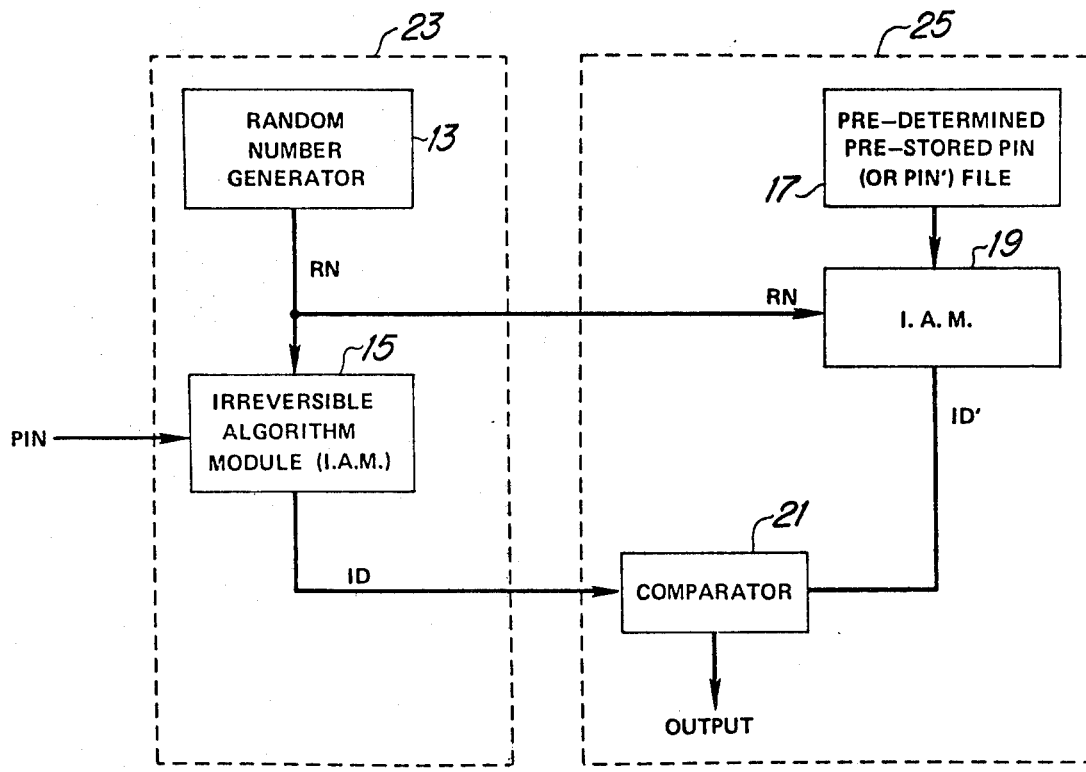
FIGS. 1A and 1B are block diagrams showing, respectively, the apparatus and method of the present invention.
Figure 1B:
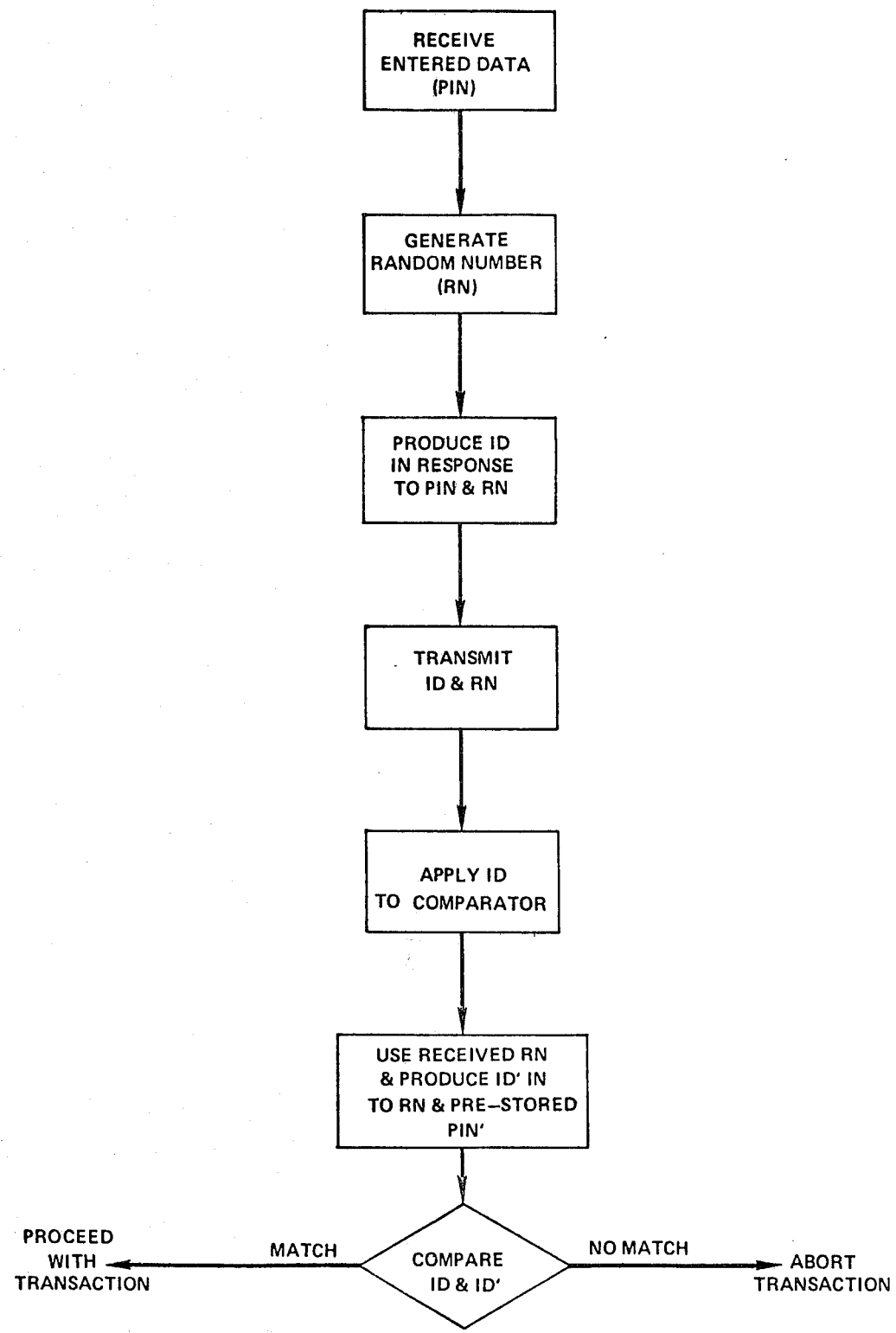

Referring now to FIGS. 1A and 1B, there are shown an apparatus and a method for improving the security of transmitted data between stations. The apparatus and method offer improved security by not requiring the transmission of PIN data from the originating or user station to the destination or processing station. The apparatus comprises at a transmitting location 23 a random number generator 13, and an irreversible algorithm module (I.A.M.) 15 (for example, of the type disclosed in U.S. Pat. No. 3,938,091 issued on Feb. 10, 1976, to M. M. Atalla and A. F. Liu), and further comprises a storage file 17, another irreversible algorithm module 19, and a comparator 21 at a receiving location 25. In response to PIN data entered by a user and in response to a random number (RN) produced by random number generator 13, algorithm module 15 produces a user identifier code (ID) which may be transmitted and applied to comparator 21 at the receiving location. The RN produced by random number generator 13 is also transmitted to an I.A.M. 19 in the receiving station 25. A predetermined authentic PIN (prestored in a selected register of storage file 17) may be accessed and applied to algorithm module 19 along with the received RN to produce a new user identifier code (ID'). The algorithm module 19 encrypts or encodes the signals applied thereto in a manner which is identical to module 15. The previously produced user identifier code (ID) is then compared with the newly produced user identifier code (ID') by comparator 21. If a match occurs (i.e., if ID and ID' are found to be the same), an output data value is produced (or internal flag is set) indicating that the transaction (e.g., user withdrawal of money from a bank) should proceed. If no match occurs, comparator 21 produces an output value indicating that the transaction should not proceed.

From the above-described apparatus and method of FIGS. 1A and 1B, therefore, it is seen that no personal identification number of the user (PIN) is transmitted from the originating or user location 23 to the destination or receiving location 25.

Figure 2A:
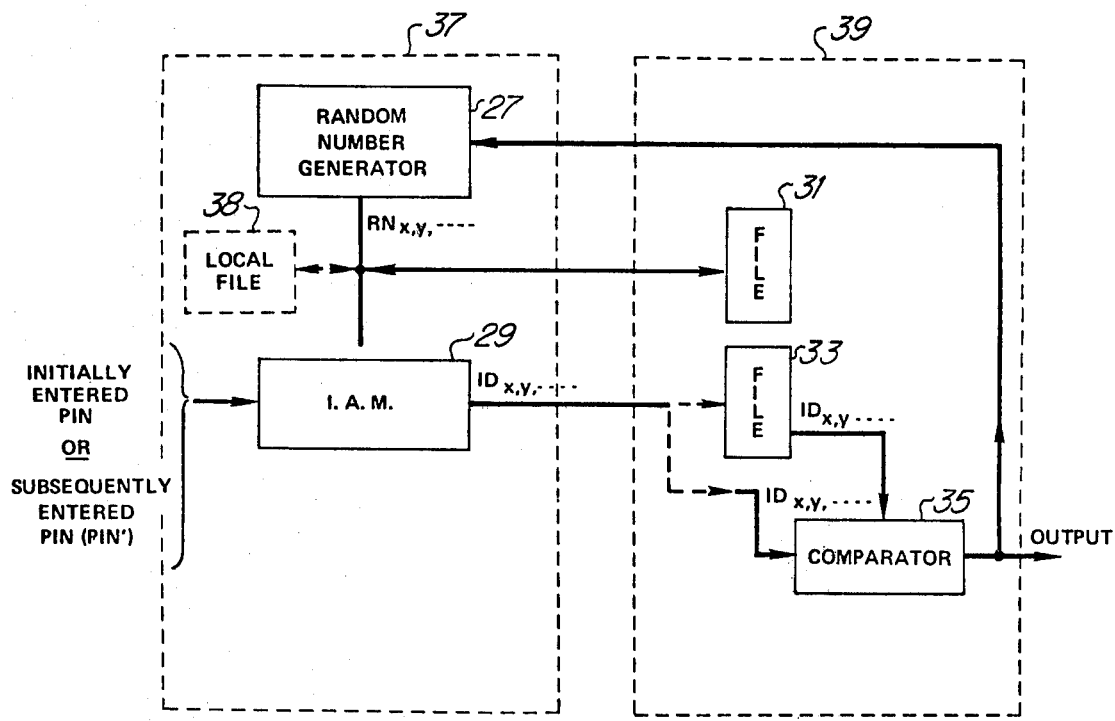
FIGS. 2A and 2B are block diagrams showing, respectively, alternative embodiments of the apparatus and method of the present invention.
Figure 2B:
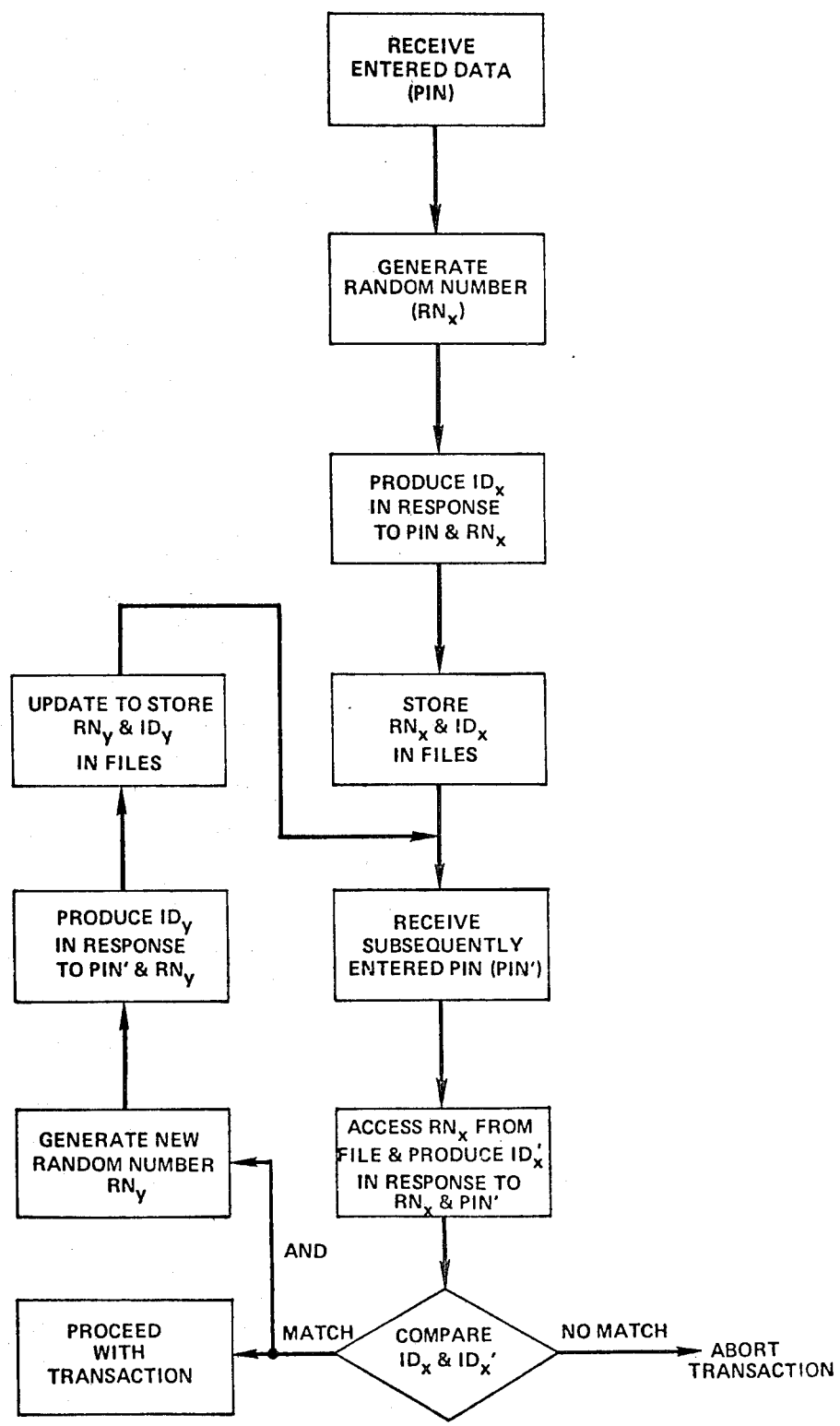

Another embodiment of the present invention is shown in FIGS. 2A and 2B. In this embodiment, the user identifier code (ID) is produced in response to RN and to entered PIN data in a manner similar to that shown in FIGS. 1A and 1B. However, only RN and ID are transmitted from user station 37 to file storage 31, 33 at processing station 39. In this embodiment, no PIN is transmitted between stations, nor is the PIN stored in the file 31, 33 where it may be susceptible to unauthorized access.

In this embodiment, the present apparatus operates, as shown in FIG. 2B, to update the identifier code ID and the random number RN in storage files each time a proper verification of user is established. Thus, a user's initial entry of a PIN is combined with an RN via an irreversible algorithm module of the type previously described to produce an ID which, with the associated RN, may be transmitted and stored in files 31, 33 at the receiver station 39 (and optionally at a local file 38).

Thereafter, the authorized user again enters his PIN (referred to herein as PIN'), and the RN is accessed from the file 31 (or optionally from the local file 38). The PIN' and the retrieved RN ($RN_x$ herein) are encrypted by the algorithm module 29 to produce the ID (which should be identical to the ID in file 33) for transmission to comparator 35 at the receiving station 39. There, the comparison is made with the ID retrieved from file 33. If the match is detected, the output from comparator 35 provides the indication that the present transaction may proceed, and also initiates the generation of a new random number $RN_y$. This new random number is encrypted by the algorithm module 29 along with the PIN' which was entered in the present transaction to yield the new $ID_y$. The new $RN_y$ and new $ID_y$ are then transmitted to files 31, 33 (and optionally to local file 38) to supplant $RN_x$ and $ID_x$ previously stored therein. In this manner, a user identifier code is dynamically stored and updated each time an authorized user is verified. More importantly, however, no PIN need be stored or transmitted in order to verify the authorized user.

Figure 3A:
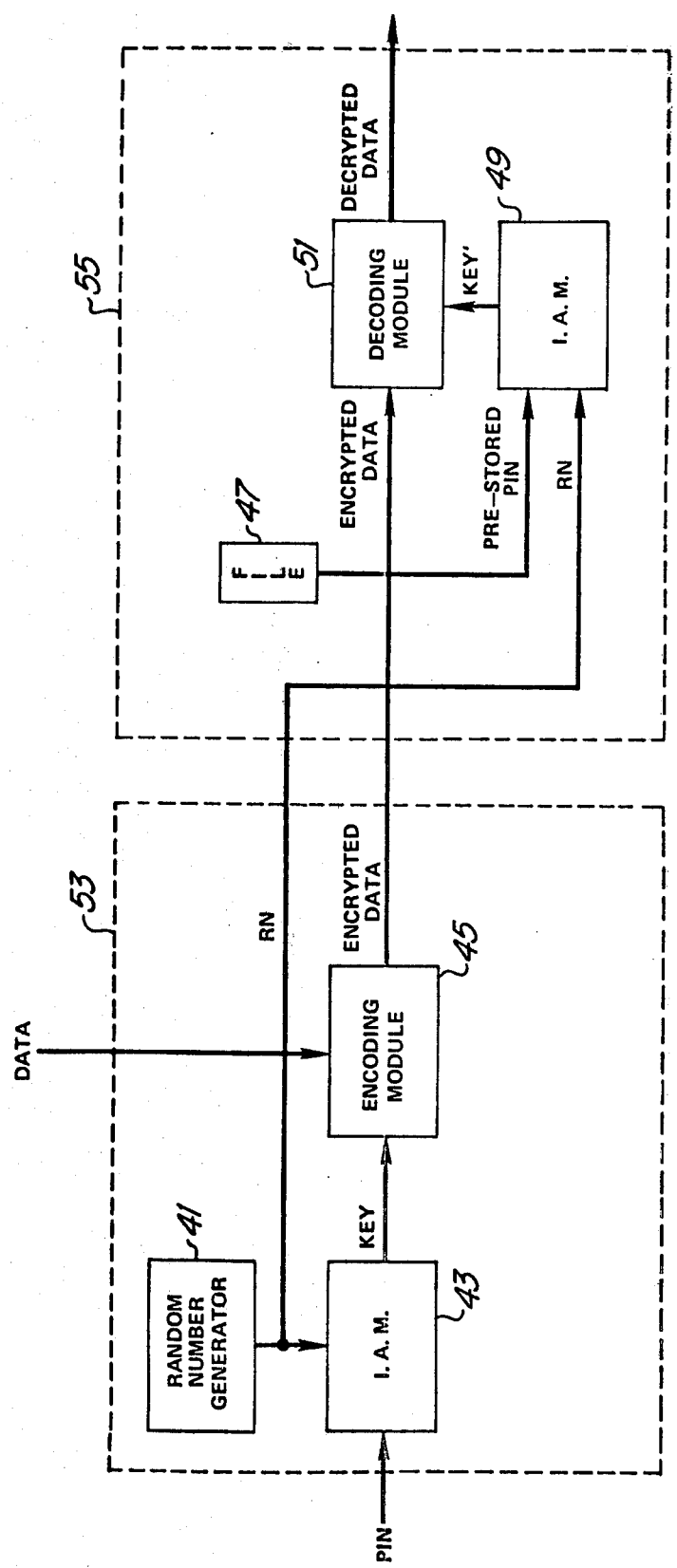
FIGS. 3A and 3B are block diagrams showing, respectively, other alternative embodiments of the apparatus and method of the present invention.
Figure 3B:
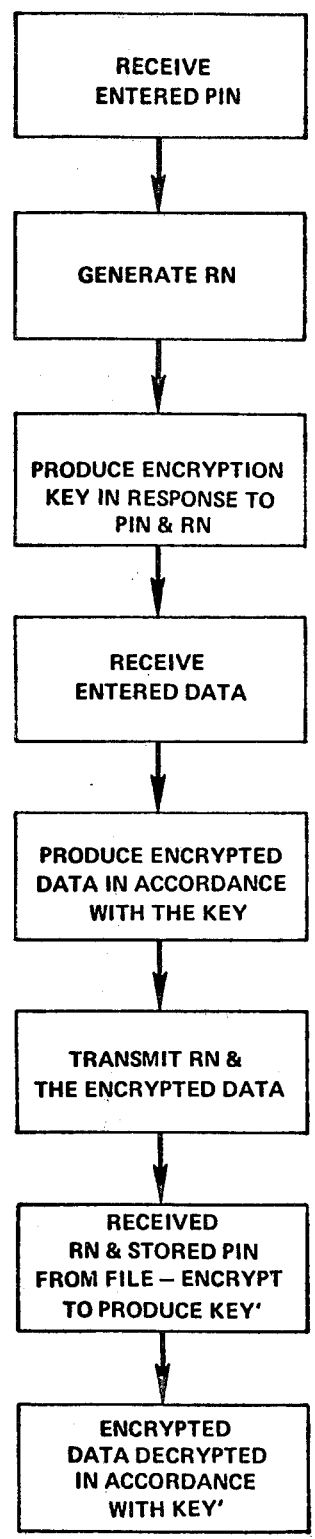

Referring now to the embodiment of the present invention, as illustrated in FIGS. 3A and 3B, a PIN in storage 47 is used with a random number RN to produce a KEY code by which data may be encrypted (encoded). However, the KEY code used to encrypt data is not transmitted. In response to a PIN entered by a user and a random number (RN) generated by a random number generator 41, irreversible algorithm module 43 of the type previously described produces an encryption key (KEY) which is applied to encoding algorithm module 45 (e.g., an encoder such as The Bureau of Standards Chip incorporating the National Bureau of Standards' encryption-decryption algorithm which is the Federal Information Processing Standard approved by the U.S. Department of Commerce). In response to applied data, encoding module 45 encodes the data in accordance with the encryption key (KEY). The encoded data, together with the associated random number (RN) is then transmitted from user station 53 to processing station 55. The random number (RN) thus received by station 55 and the prestored authentic PIN which is accessed from file 47 are applied to algorithm module 49 which produces an encryption key (KEY') that should be identical to the KEY, and this KEY' is applied to decoding module 51. Decoding module 51 operates in accordance with the same National Bureau of Standards encoding scheme as module 45 and produces the desired decrypted (decoded) data. It should be noted that as long as the entered PIN matches the prestored PIN, KEY will match KEY', and the decrypted data will match the entered data. This embodiment of the present invention thus obviates the need to transmit the generated KEY between stations and eliminates risk of disclosure of the KEY during such transmission. Also, it should be noted that in this embodiment, the KEY is determined and the PIN is verified simultaneously under the control of the user. That is, the encryption and decryption of data are solely under the control of the user by virtue of his own entered PIN. Also, the user who entered the PIN is verified in response to the encrypted data being received and decrypted at the receiver station 55 using the corresponding PIN that is retained in file 47. Further, the information which is transmitted between stations includes a random number which changes after each transaction and the encrypted data which also changes form after each transaction, even for the same data entered at station 53.

Figure 4A:
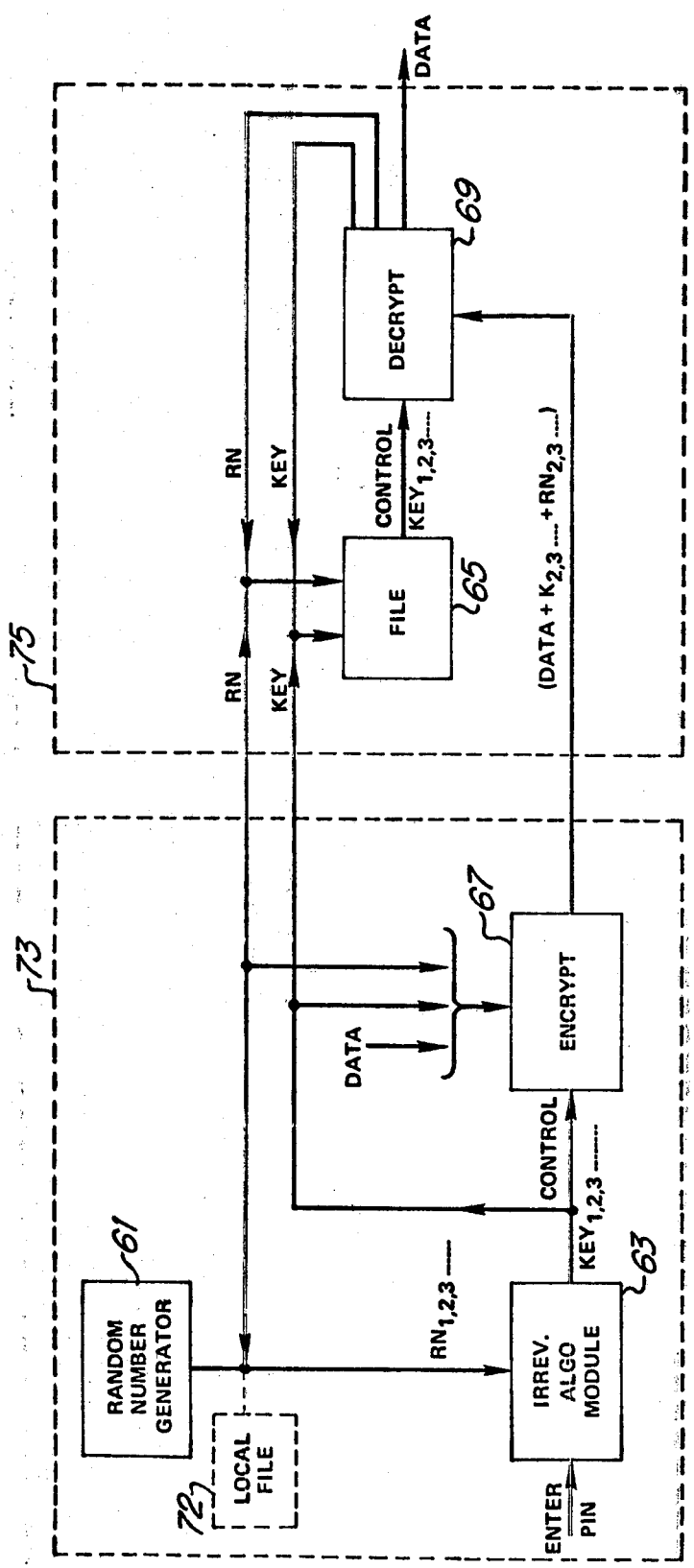
FIGS. 4A and 4B are block diagrams showing, respectively, still other alternative embodiments of the apparatus and method of the present invention.
Figure 4B:
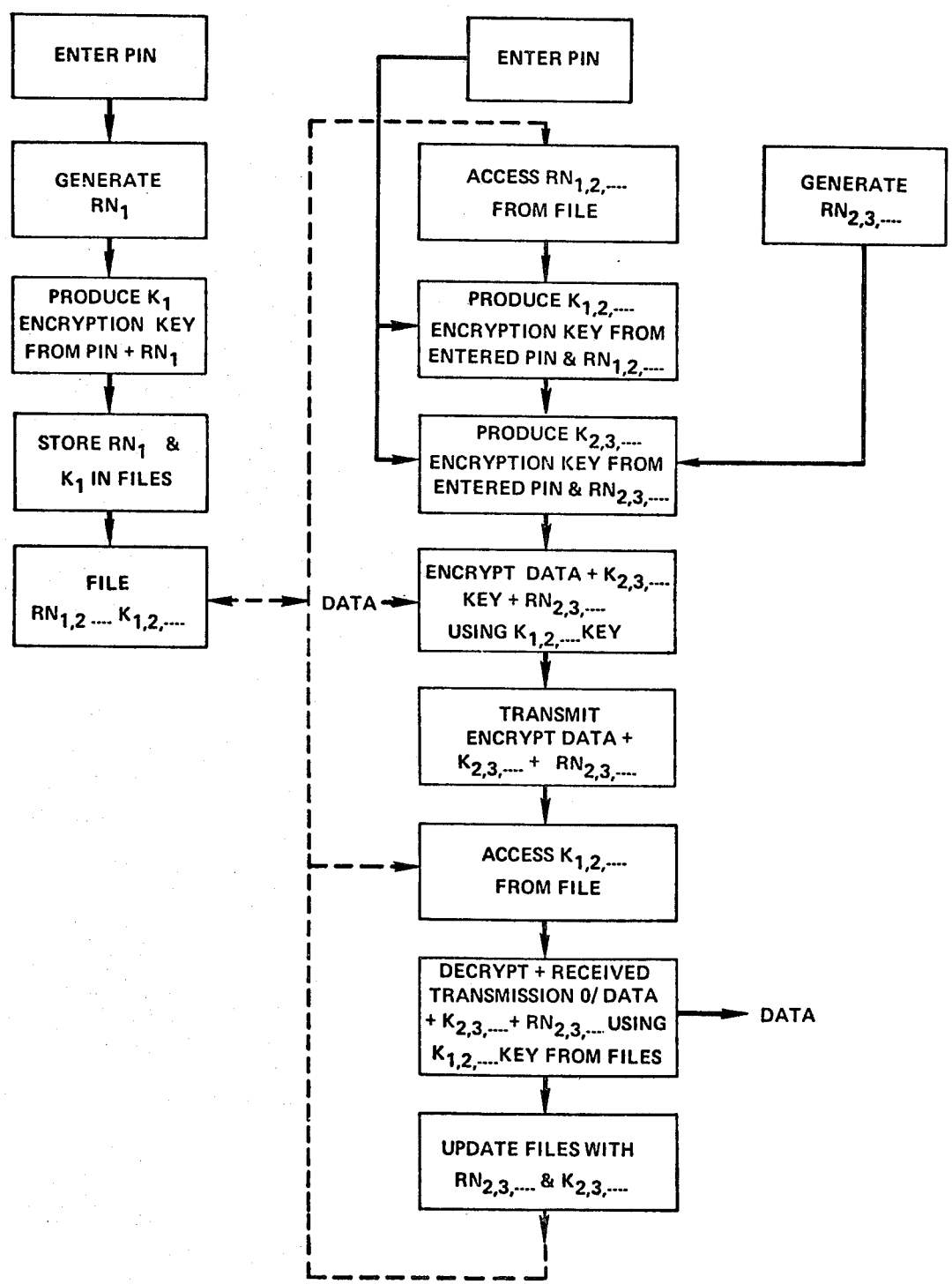

In the embodiment of the present invention shown in FIGS. 4A and 4B, there is no need to transmit the PIN from user station 73 to processing station 75, and no need to store PIN information in a file. As shown in FIGS. 4A and 4B, the system is first initialized in preparation for user transactions. The PIN is entered by the user during initialization and random number generator 61 generates a random number ($RN_1$) and applies the $RN_1$ to irreversible algorithm module 63 of the type previously described. Module 63 combines the PIN and $RN_1$ information and produces therefrom a first encryption key ($KEY_1$) to be used in later encryption of data. The $RN_1$ and $KEY_1$ are then stored for later retrieval in a storage file 65 at the processing station 75 (and optionally the random number may also be stored in a local file 72).

In commencing a transaction, the user first enters his PIN into the algorithm module 63. In response to the entered PIN, and in response to $RN_1$ which is accessed from file 65 (or optionally from local file 72), the module 63 reproduces the encryption key ($KEY_1$) which is applied to the control input of the encryption module 67 (say, of the National Bureau of Standards type previously described). With the encryption module 67 set to encode in accordance with $KEY_1$, another random number ($RN_2$) is generated by random number generator 61, and is applied to modules 63 and 67. The module 63 is able to produce an encryption key ($KEY_2$) from the applied $RN_2$ and from the PIN that is available during the present user transaction. $KEY_2$ and $RN_2$ which was associated with $KEY_2$ are included with the applied data (which data may include a fixed alphanumeric reference) for encoding by module 67 under the control of $KEY_1$ to produce the encrypted message "DATA+$RN_2$+$KEY_2$". This encrypted message is then transmitted from user station 73 to processing station 75 where decryption module 69 (matching encoding module 67) decrypts or decodes the encrypted message in accordance with $KEY_1$ which is accessed from the file 65 where it was originally entered during the initialization operation previously described. The DATA is thus retrieved in clear text and the $RN_2$ and the $KEY_2$ are also separately available for updating file 65 (and optionally local file 72) with $RN_2$ and $KEY_2$ in place of $RN_1$ and $KEY_1$, respectively.

In a subsequent transaction, the user again enters his PIN into the algorithm module 63. In response to the entered PIN, and in response to the updated $RN_2$ accessed from file 65 (or from local file 72), the module 63 reproduces the encryption key ($KEY_2$). With the encryption module 67 set to encode applied data in accordance with $KEY_2$, the random number generator 61 produces another random number $RN_3$ which is applied to the algorithm module 63 along with the PIN that is available during the present transaction to produce another encryption key ($KEY_3$). $KEY_3$ and $RN_3$ are included with the DATA that is applied to the encoding module 67 which produces the encrypted message "DATA+$RN_3$+$KEY_3$" when encrypted under the control of $KEY_2$. This encrypted message is then transmitted from user station 73 to processing station 75, where decoding module 69 decrypts the encrypted message in accordance with the $KEY_2$ which is accessed as the updated entry from file 65. The DATA is thus retrieved in clear text and the $RN_3$ and $KEY_3$ are again available to update the file 65 (and local file 72) for use in subsequent transactions.

The reference data previously referred to as being included with the input DATA may simply be a standard code word which must be extracted at the output of module 69 as an indication that the user inserted the proper PIN. In this way, the encrypted message transmitted to and received by the processing station 75 can be promptly decrypted to verify the PIN before the file 65 (or local file 72) is updated with keys and random numbers which would not relate to the authorized PIN.

Thus, it can be seen from FIGS. 4A and 4B that not only is PIN information not stored or transmitted from user station 73 to user station 75 but, for added security, the key used to encrypt data in response to a given user transaction is not the same key that is used to decrypt the encrypted data during such transaction. Also, it should be noted that the stored code words are updated in each transaction and that these code words are under the control of the user.

Figure 5A:
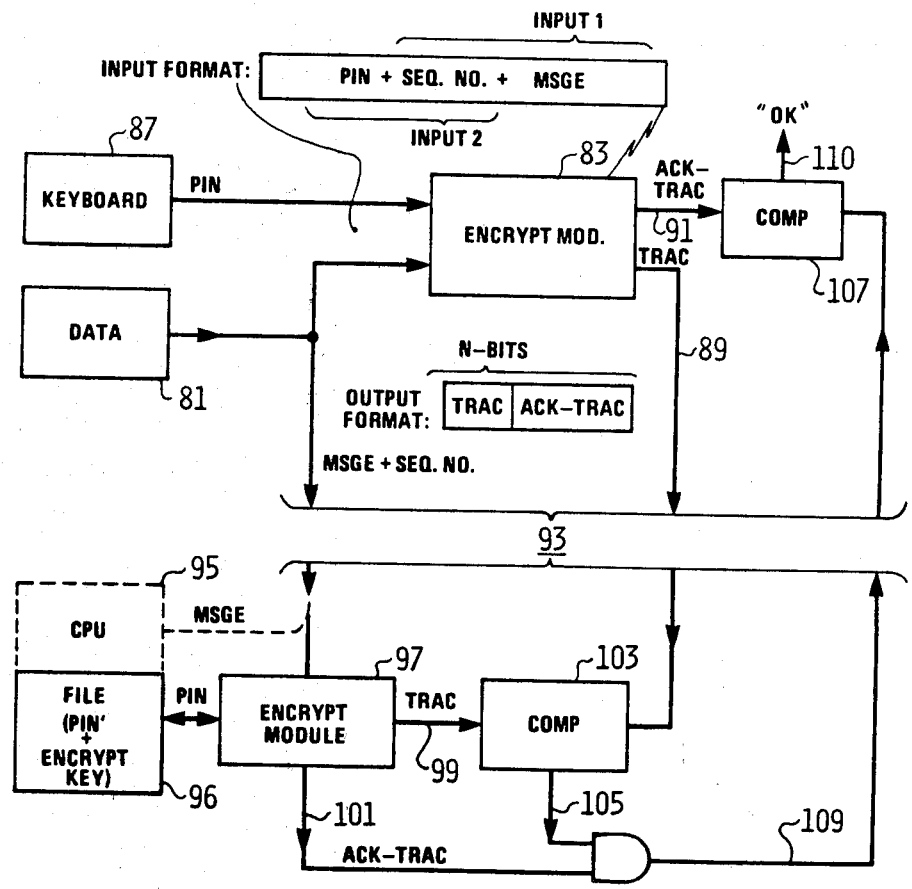
FIG. 5A is a schematic block diagram of another embodiment of the present invention in which a transaction may be securely controlled at a remote location.

With the personal identification number of an authorized individual stored in encrypted form (PIN') along with an encrypted key for that encryption of the PIN, a system is provided which enables the authorized individual to control various secured transactions at remote locations without the need for matched pairs of modules and without compromising the security of the system. In one embodiment of the system, as shown in the block diagram and flow chart of FIGS. 5A and 5B, respectively, the data 81 or message MSGE to be secured against alteration or unauthorized use (such as account number, amount of money being transferred, type of transfer, etc.) is combined with a sequence number (such as date and time) to supply to an encryption algorithm module 83. Of course, the data may be in clear text or in encoded form. In addition, the authorized person introduces his PIN via keyboard 87 or other entry device to produce another input to the module 83. This algorithm used in module 83 may be of the National Bureau of Standards type previously described, or of the type described in the aforementioned U.S. patent issued to Atalla and Liu. The module 83 accepts the two inputs (or obtains two inputs from any combination of all the entry bits involved) in a format as shown in FIG. 5A and encodes the input information in accordance with the operating algorithm thereof to produce an N-bit output, one portion of which serves as the TRansfer Authorization Code (TRAC) signal 89 and another portion of which serves as the ACKnowledgement-TRansfer Authorization Code (ACK-TRAC) signal 91. Only the data or message MSGE plus sequence number plus TRAC output 89 are transmitted over a data link 93 to a remote location. Note that the PIN for the authorized individual is not transmitted from the location where introduced and is not stored in any file.

Thus, the data link 93 may be a simple and convenient data link or voice communication over telephone lines or a writing transmitted by telegram or mail, or the like. Since the TRAC signal 89 was generated using the PIN and the sequence number and the MSGE, any alteration of the MSGE or TRAC or sequence number (e.g., by an unauthorized attempt to rerun a cash withdrawal transaction) will alter the transmitted TRAC which will not compare favorably with the TRAC signal regenerated at the receiving location. Thus, an unauthorized alteration of any part of the MSGE, SEQ. NO. or TRAC during transmission will result in unfavorable comparison and rejection of the received transmission, as later described.

The received transmission is compared for parity of TRAC signals by first accessing the memory 96 of a local central processing unit or computer 95 for the PIN of the authorized individual that is stored in encrypted form, together with the encrypted key that was used to encrypt the PIN and also stored in the memory, as previously described. From this information obtained from the computer memory 96, the PIN of the authorized individual may be regenerated using the encryption module and is then only available internally for use in regenerating a TRAC signal at the receiving location. The PIN thus regenerated from information accessed out of the computer memory 96 and the transmitted MSGE and SEQ. NO. received at the remote location are encrypted in module 97 which operates according to exactly the same algorithm as is used in module 83 on the two input signals that are applied in exactly the same format as is applied to module 83. The resulting TRAC 99 and ACK-TRAC 101 outputs appear as a composite N-bit output in the same format as the outputs of module 83. Thus, the transmitted and received TRAC signal 89 must be identical to the regenerated TRAC signal 99 for the received MSGE and SEQ. NO. signals and encrypted PIN and encrypted key signals from memory 96. These two TRAC signals are compared in comparator 103 to produce an output 105 in response to parity of the two TRAC signals, and this parity output signal gates out the ACK-TRAC signal 101 for retransmission back to the originating location via a convenient communication link 93. Of course, the local computer 95 is also enabled to operate on the MSGE signal, for example, to debit an account, update a file, etc. If no favorable comparison of TRAC signals in comparator 103 is obtained, the received MSGE signal need not be acted upon and a suitable non-response signal may be returned to the originating location.

For a favorable comparison of TRAC signals, the resulting ACK-TRAC signal is retransmitted and received back at the originating location and is compared in comparator 107 with the ACK-TRAC signal that was originally generated from the MSGE and SEQ. NO. signals and PIN signal received from the authorized individual upon initiation of the transaction. These signals must be identical for the given MSGE and SEQ. NO. signals and proper PIN from the authorized individual applied in identical formats to identical modules 83 and 97. Thus, unfavorable comparison of the two ACK-TRAC signals in comparator 107 is an indication of a possible alteration of one or more of the signals from which each of the ACK-TRAC signals is generated, or of an error or alteration in the retransmitted ACK-TRAC signal 109. Of course, an output 110 generated upon favorable comparison of the two ACK-TRAC signals in comparator 107 is an indication of completion of the transaction (e.g., debiting an account, dispensing cash, etc.), which was initiated by the individual whose PIN 87 was introduced.

Figure 5B:
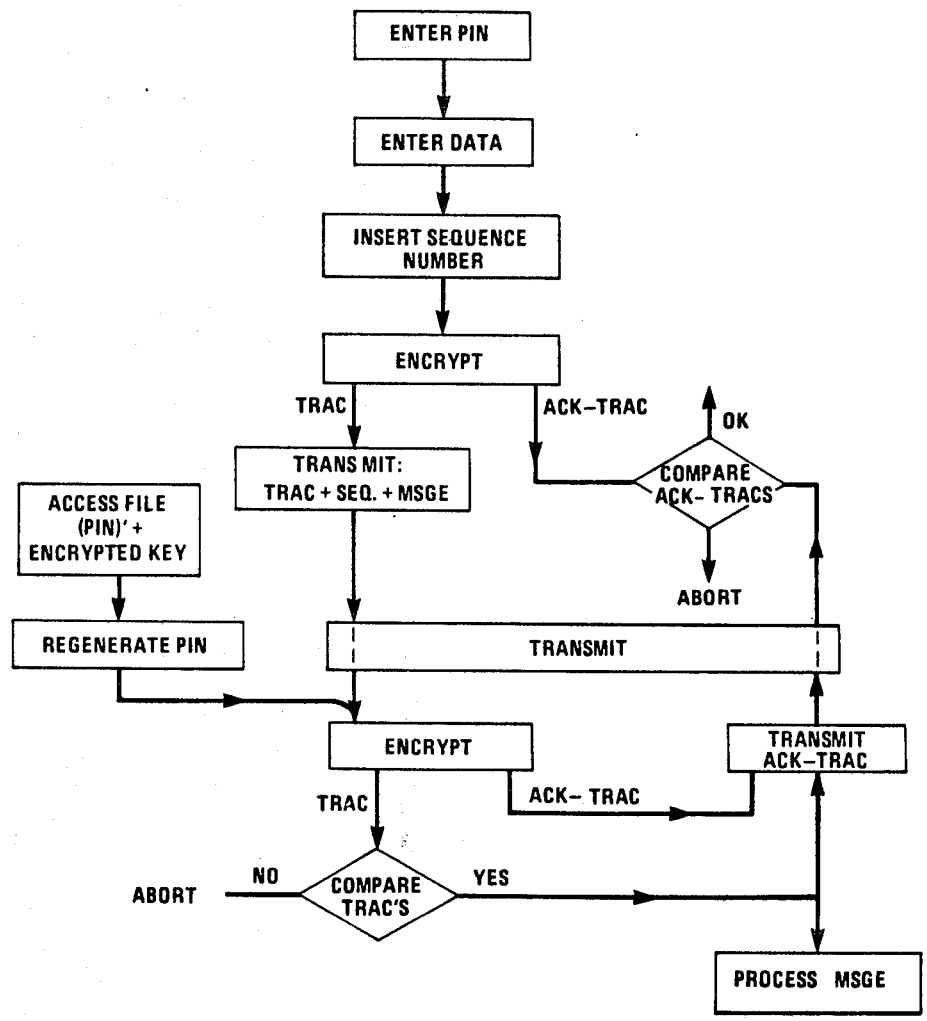
FIG. 5B is a flow chart illustrating the operation of the embodiment of FIG. 5A.

It should be noted that the system operated as described in connection with FIGS. 5A and 5B assures the proper identity of the individual whose encrypted PIN and encrypted key are on file at the receiving location (e.g., bank). Also, the MSGE cannot be altered and cannot be replayed without detection, so that convenient less secure data-transmission links can be used without degrading the security of the over-all system. It should be noted also that the individual's PIN is not transmitted in clear text from anywhere within the system, and that ample record-producing checkpoints are provided for later, convenient auditing procedures.

Figure 6:
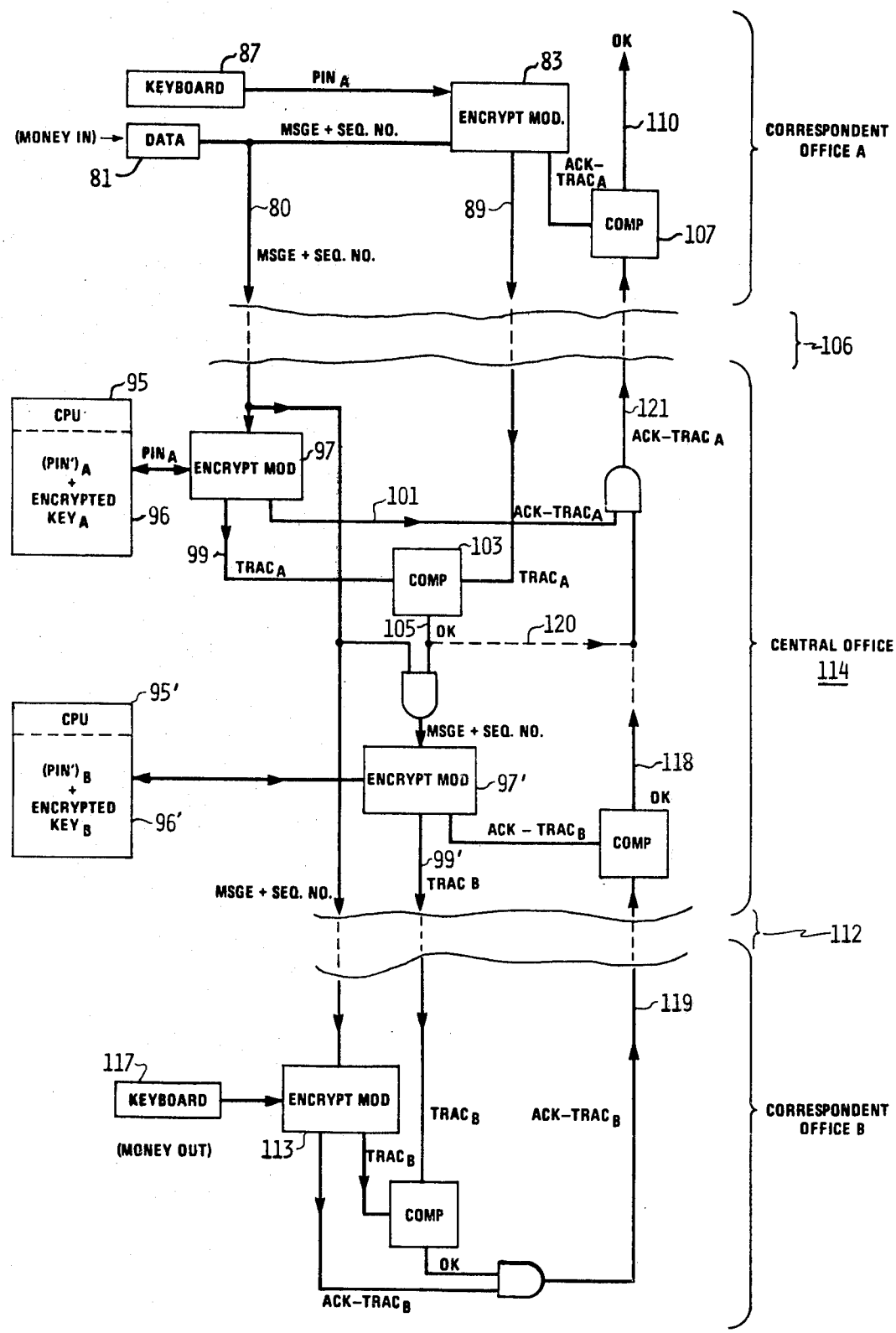
FIGS. 6, 7A and 7B are illustrations of other embodiments of the present invention in which transactions may be securely controlled at remote branch locations of remote central offices.

Referring now to the illustration of FIG. 6, there are shown the method and means for controlling a transaction such as a "wire transfer" of funds from a remote location with a high degree of security against unauthorized manipulation. In this embodiment, the components of the system which are similar to the components of the system in FIG. 5A are similarly labeled. Thus, an authorized individual located at correspondent office A (e.g., a bank, trucking company, etc.) is able to control a transaction such as the "wire transfer" of money for withdrawal from correspondent office B with the aid of the circuitry, files and operation of the central office. As in the embodiment of FIG. 5A, an individual (e.g., manager or officer, etc.) whose encrypted PIN and encrypting key are on file at the central office is able to generate a $TRAC_A$ signal 89, as previously described, which is transmitted to the central office over a convenient data transmission link 106, along with the composite signal 80 including data or message or instructions MSGE and appropriate sequence number (e.g., date and time). These signals when received at the central office are used to regenerate a PIN for the individual in the manner previously described from the information about that individual that is stored in the central computer 95 and memory 96. The PIN thus produced is then available only internally to produce a $TRAC_A$ signal 99 for comparison with the transmitted and received $TRAC_A$ signal 89 in comparator 103. However, in this embodiment the output signal 105 that is generated in response to favorable comparison is used to generate another or $TRAC_B$ signal for transmission to the correspondent office B. Optionally, this signal may also be used 120 to gate out an $ACK-TRAC_A$ signal for transmission back to the originating office A. The new $TRAC_B$ signal is produced by accessing from storage in computer memory (which, of course, may be the same computer and memory but at a different memory address location) the encrypted $PIN_B$ and encrypted $KEY_B$ for an authorized individual (e.g., manager or officer, etc.) at correspondent office B. This PIN information is used interactively with the irreversible algorithm module 97' (which, of course, may be the same module 97 used in the serial-state operation of the same computer 95, 96) in order to generate the $PIN_B$ which is only available internally for use in generating the $TRAC_B$ signal 99' in the manner previously described in connection with the $TRAC_A$ signal.

The $TRAC_B$ signal and the MSGE and SEQ. NO. signals may then be transmitted over the data link 112 to the correspondent office B. There, the $PIN_B$ may be manually supplied via keyboard 117 by the authorized individual (or may be regenerated in the manner previously described by interactive operation of computer 115 with the encryption module 113 from PIN information accessed from storage in computer memory).

The circuitry at correspondent office B operates in the manner previously described in connection with the receiving location in FIG. 5A to produce ACK-$TRAC_B$ signal 119 that is transmitted back to the central office. When received there, the ACK-$TRAC_B$ signal is compared with the ACK-$TRAC_B$ signal locally generated in the manner previously described. The signal 118 generated in response to favorable comparison of these two signals indicates that the requested transaction was completed at office B. Optionally, the signal 118 may be used to enable the gate to transmit the ACK-$TRAC_A$ signal 121 back to the correspondent office A where it is compared with the original ACK-$TRAC_A$ signal generated in the manner described in connection with FIG. 5A. Favorable comparison of all the ACK-TRAC signals would provide indication at office A that the requested transaction was completed at office B.

Figure 7A:
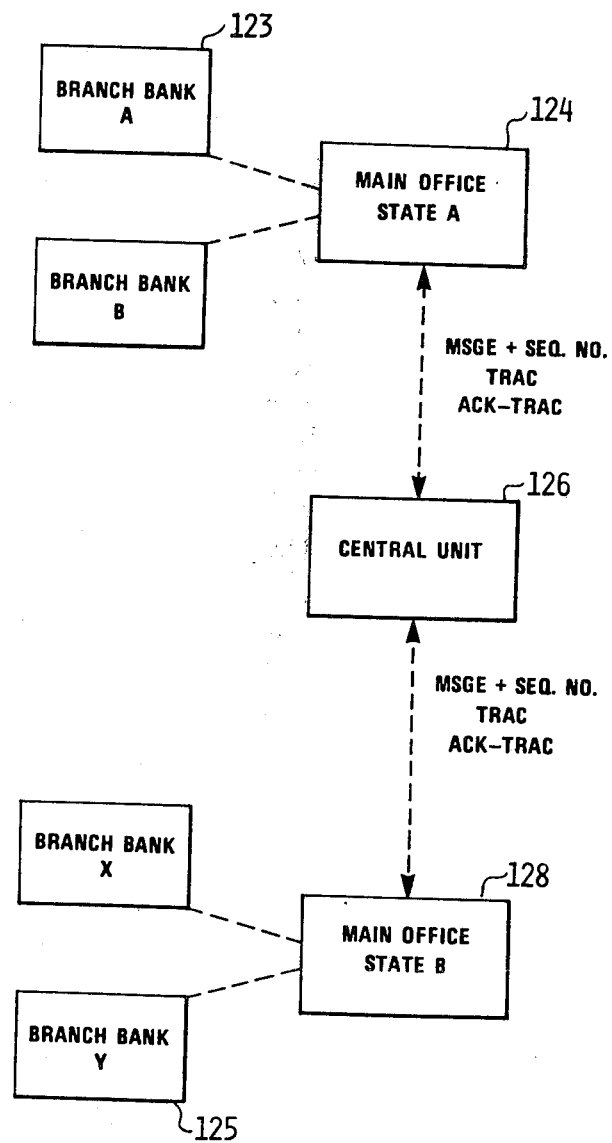
Figure 7B:
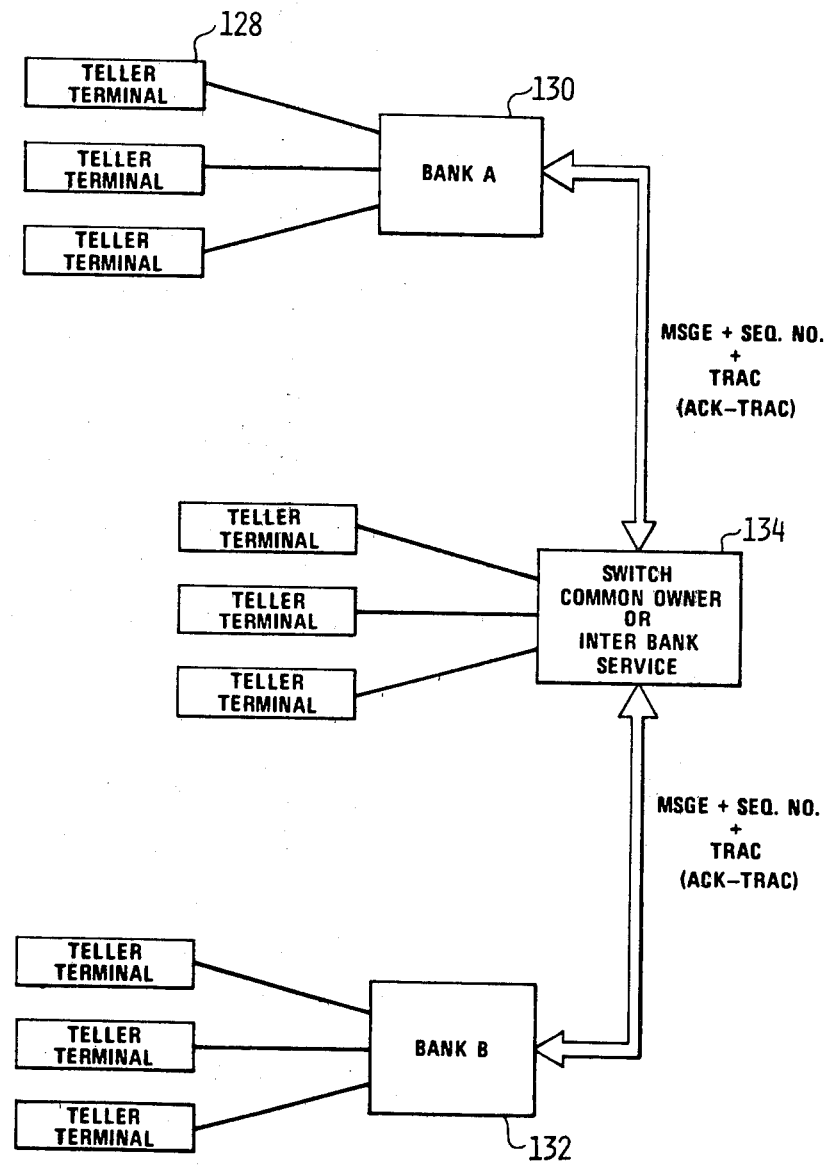

Thus, the instructions and acknowledgements required to command a transaction at the remote office are transmitted and returned with substantial security against errors and unauthorized alterations, and with ample provisions for auditable records of the transaction. It should be readily apparent that transactions between remote offices of unassociated businesses may thus be conducted in this manner through one or more "central" office links, as shown, for example, in FIG. 7 in connection with interbank transactions. By introducing additional circuitry similar to that which was described in connection with central office 114 for each central unit or office between the ultimate end-users, a transaction may be initiated by one BANK A 123 and be consummated at BANK Y 125 under command and control of BANK A and with verification back to BANK A, all with a high degree of immunity from errors and unauthorized alterations. This is accomplished by retaining in the files of office 124 the requisite encrypted PIN's and encrypted keys therefor for each of its branches (or the officers thereof), and by retaining in the files of office 128 the requisite encrypted PIN's and encrypted keys therefor for each of its branches (or the officers thereof). Then, the central unit 126 need only retain in its files the requisite encrypted PIN's and encrypted keys therefor for each of offices 124 and 128 (or the officers thereof) in order to complete secured transactions in the manner previously described.

In similar manner, an interchange transaction between bank A and bank B may be accomplished by using a data switch to route customer information and TRAC signals between banks A and B. Thus, data from a customer of one bank 132 which is entered on a Teller Terminal 128' such as a conventional automatic teller machine (ATM) in one bank 130 may be routed to the proper bank via the data switch 134 for comparison with data on file for that customer at bank 132. The TRAC, MSGE and SEQ. NO. generated in response to the customer's entry of his own PIN may thus be transferred via switch 134 to the proper bank 132 for comparison there with data on file, all as previously described, for example, with respect to the embodiment of FIG. 6.

Figure 8:
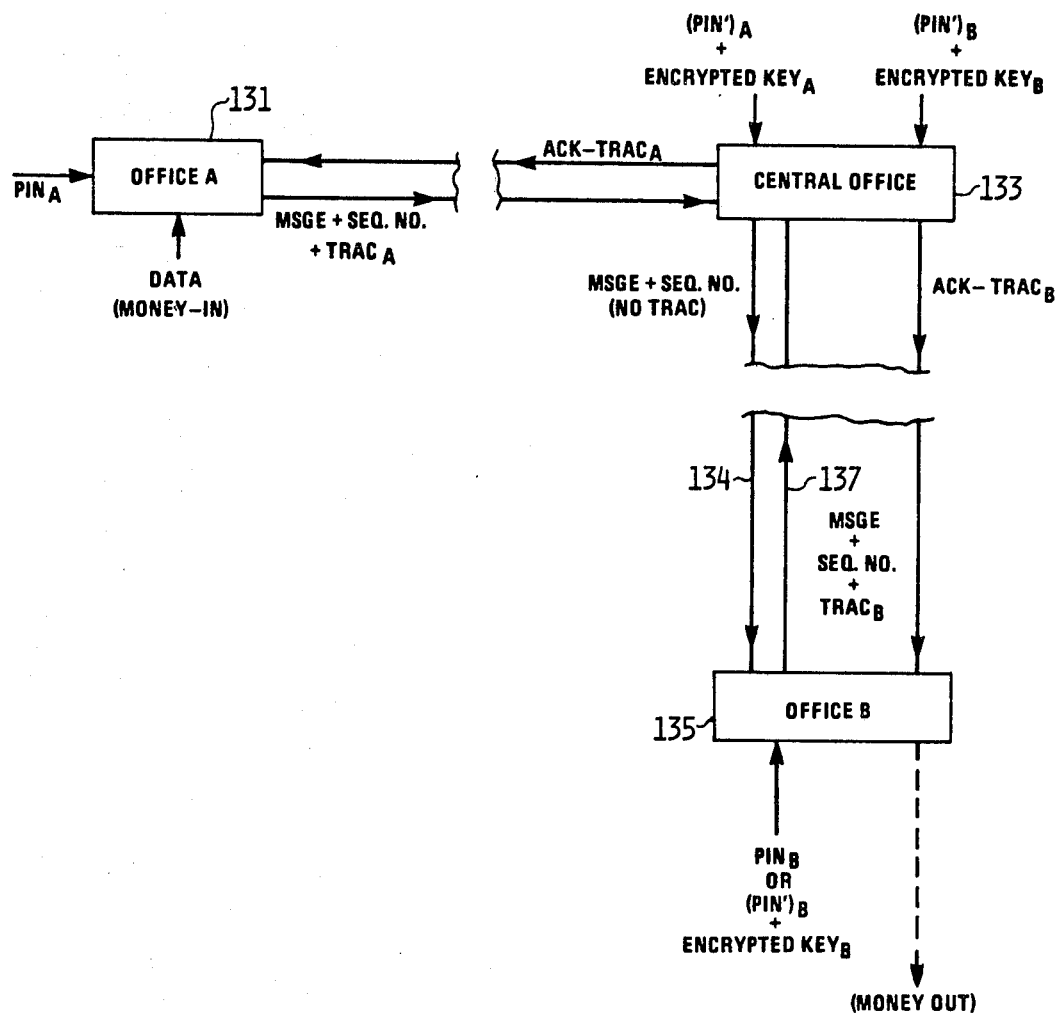
FIG. 8 is an illustration of another embodiment of the present invention using prestored identification information about two individuals or entities in order to securely control a transaction at a remote branch location of a remote central office.

Referring now to the illustration of FIG. 8, there is shown another embodiment of the present invention in which a central office is able to implement the command and confirmation of a transaction consummated between remote offices. In this embodiment, the apparatus and method of operation for transferring data between office A 131 and central office 133 is similar to the operation previously described in connection with FIGS. 5A and 5B, except that upon favorable comparison of $TRAC_A$ signals, only the MSGE and SEQ. NO. signals 134 are retransmitted to the office B 135 and, optionally, the ACK-$TRAC_A$ signal may also be returned to office A 131 as an acknowledgment of proper receipt of the transmitted information. At office B, the $PIN_B$ signal for another authorized individual is provided for generating a $TRAC_B$ signal as previously described for transmission back to the central office 133 with the MSGE and SEQ. NO. signals 137. At the central office 133 the $PIN_B$ must be regenerated from stored information in order to produce a $TRAC_B$ signal therefrom in combination with the MSGE and SEQ. NO. signals, as previously described. Upon favorable comparison of $TRAC_B$ signals at the central office 133, the ACK-$TRAC_B$ signal may be transmitted back to the receiving office B 135 as a confirmation of unaltered communication of data between office B 135 and the central office 133.

Figure 9:
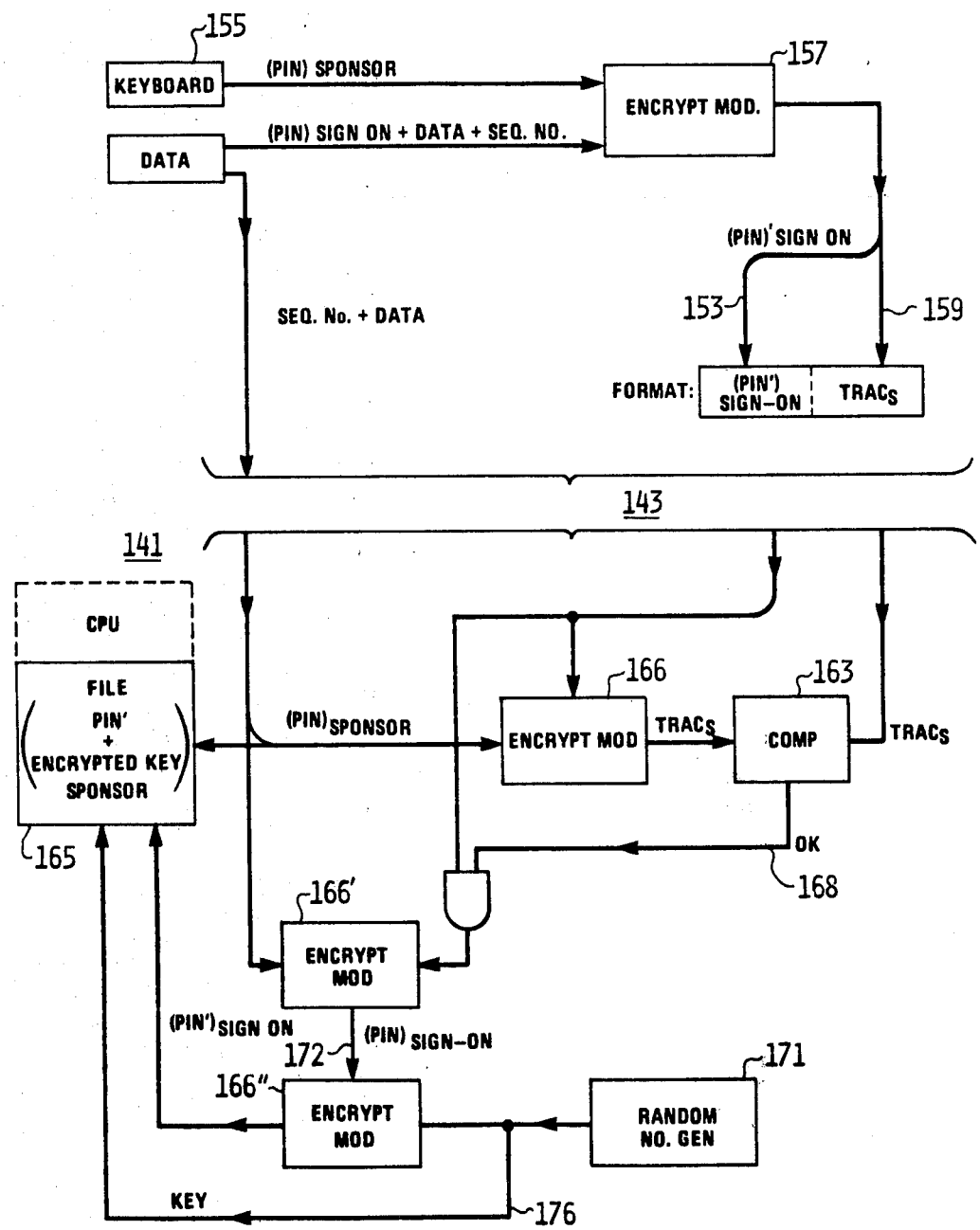
FIG. 9 is an illustration of an embodiment of the present invention in which encoded identification information for an individual may be stored remotely using a sponsor and associated identification information.

Referring now to the illustration of FIG. 9, there are shown the apparatus and the method involved in remotely signing on a new individual who is to receive authorization to use the system. This is accomplished with the aid of a sponsor who is already authorized to use the system and whose PIN is already stored in encrypted form in the remote (say, central) location 141. It is possible in this embodiment of the present invention to introduce a new PIN for a new individual at a remote storage file with a high degree of security while using the transmission data link 143 in a manner similar to that which was described above. Note that this embodiment requires the entry of a new PIN for the new individual as part of data (entered, for example, by a keyboard) to be encrypted by the encryption module 157. This information, along with a sequence number (say, date and time) is then encrypted in the encryption module 157 during a first operating state using the PIN of the sponsor as part of the encryption key. The data may include an indication of the bit-length of the PIN for the new individual, etc., and the encryption thereof yields an encrypted PIN 153 for the new individual. Also, the PIN for the sponsor, entered by keyboard 155 along with other data and sequence number and encrypted PIN for the new individual can be applied to the encryption module 157 operating during a sequential state or time-shared mode to produce a $TRAC_S$ signal 159. This $TRAC_S$ signal is transmitted along with the encrypted PIN' signal 153 for the new individual and data and the sequence number signal 161 over data link 143 to the remote or central location 141.

At the remote location, the PIN of the sponsor is decrypted by the encryption module 166 from information including encrypted PIN' and encrypted key for the sponsor contained in computer memory 165. Thus, once the PIN for the sponsor is regenerated, it is available (internally only) in combination with the received SEQ. NO. and other data as one input to the module 166 while the received encrypted PIN' for the new individual serves as another input. This module then operates according to the same algorithm as module 157 to produce a TRAC$_S$ signal which should compare favorably with the received TRAC$_S$ 159. When so favorably compared (indicating transmission and reception without alteration), the resulting output 168 then controls the encryption of the PIN for the new individual. This is accomplished by first decrypting the received PIN' for the new individual to obtain the PIN for the new individual in clear text (internally only). This is obtained by decrypting in encryption module 166' the sequence number and the received encrypted PIN for the new individual. The encryption module 166' operates with the same algorithm as module 157 (and, of course, may be the same module as module 166 operating in a sequential state or time-shared mode) to yield the PIN 172 for the new individual in clear text (internally only). A random number from generator 171 is then combined with the PIN for the new individual 172 in an encryption module 166" (which, of course, can be the same as module 166 operating in a sequential state or time-shared mode) to produce the encrypted PIN for the new individual which can be stored in memory 165 along with the random number 176 used to encrypt the PIN. Of course, the (PIN') for a new individual may also be transmitted over a data link 143 to a remote location 141 with additional data necessary to identify the individual, the extent of his authority, data about the number of bits in the new individual's PIN, the encryption key, etc. Either way, a new individual may be incorporated into a total system from a remote or branch location and thereby obviate the need to sign on only at a central location.

Figure 10:
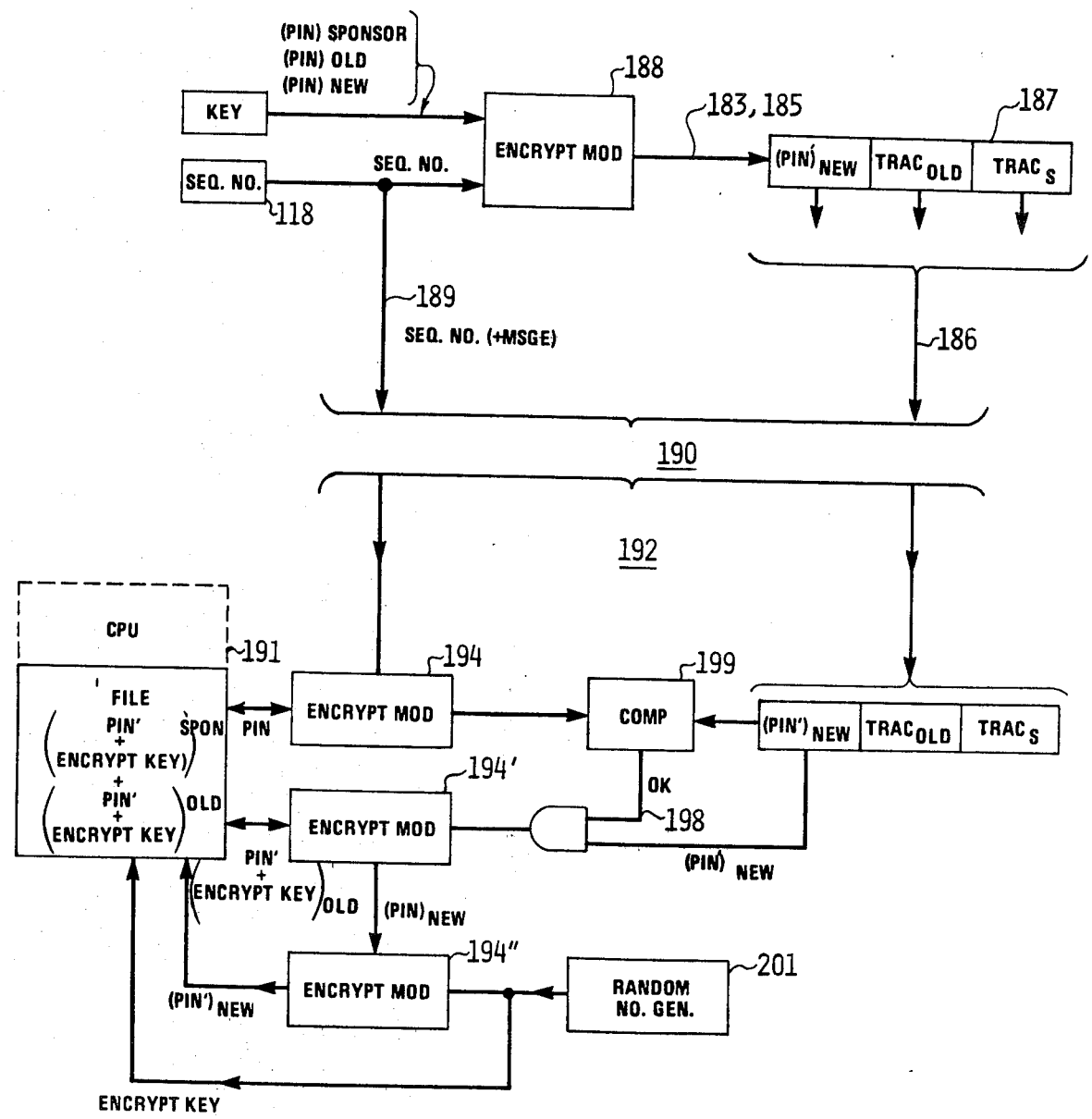
FIG. 10 is an illustration of an embodiment of the present invention in which encoded identification information for an individual that is stored remotely may be securely changed using a sponsor and associated identification information.

With reference to the illustration of FIG. 10, it should be noted that an individual may also change his own PIN from a remote location with the aid of a sponsor. The sequence number 181 may be used to prepare a TRAC$_S$ signal 183 for the sponsor and another TRAC$_{OLD}$ signal 185 for the old PIN of an established individual, all as previously described. These TRAC signals may be stored in a buffer 187 for assemblage into a format, as illustrated. In addition, an encrypted form of the new PIN for such individual is also generated by the encryption module 188 using the sponsor's PIN alone or in combination with a SEQ. NO., etc., as the encryption key. A composite signal 186, for example, in a format as illustrated, may be transmitted with the SEQ. NO. signal 189 over the data transmission link 190 to the remote location 192. Then, using an encryption module 194 (shown in three circuit locations for clarity and comprehension, but singularly usable in different sequential states or time-shared modes for the operations indicated), the encrypted PIN and encrypted key therefor for the sponsor stored in file 191 may be operated with module 194 to regenerate the PIN (internally only) for the sponsor according to the same algorithm used in module 188. This can then be combined in the module 194 with the received SEQ. NO. signal 189 to produce the TRAC$_S$ signal for the sponsor using the same algorithm as in module 188. Similarly, the TRAC signal for the old PIN of the individual may also be regenerated from information contained in file 191, all as previously described. These two TRAC signals may thus be compared in comparator 199 with the received TRAC signals in the same format. If comparison is favorable, indicating that the TRAC signal for the sponsor's PIN and the TRAC signal for the old PIN are all right, then the resulting output signal 198 controls the decryption of the encrypted new PIN for the individual using that individual's old PIN (available only internally) as the decryption key in the module 194'. The resulting new PIN for the individual may be encrypted in module 194" using a random number from generator 201 to yield the encrypted new PIN and encryption key therefor for storage in file 191, as previously described. Thus, when an individual is to be introduced into the system for the first time, he may merely be given a PIN that is set into a central file solely for the purpose of enabling him to change the PIN to one of his own, secret selections as the first transaction.

Figure 11:
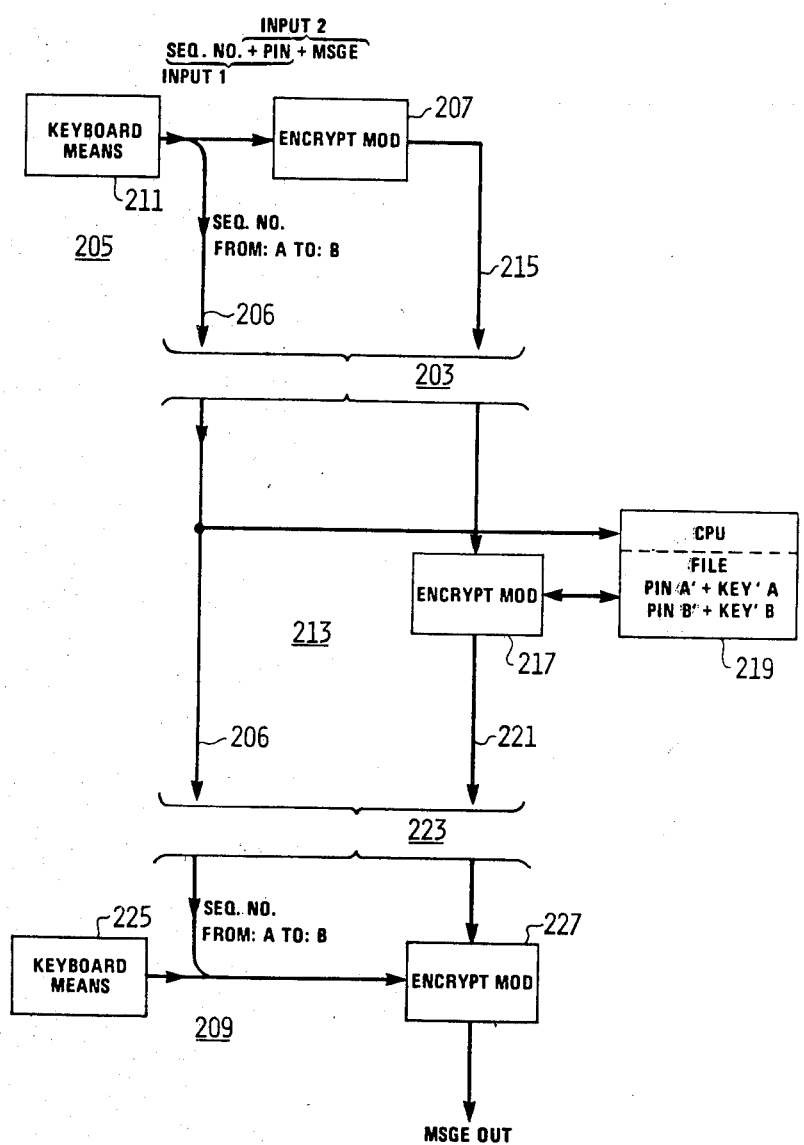
FIG. 11 is an illustration of an embodiment of the present invention in which encoded messages may be transmitted between two users via a central station which routes the encoded message.

Referring now to the illustration in FIG. 11, the present invention may be used to transmit a secured memo or other message between two users via a central station which contains the identification information for the two users and which provides the requisite routing of the encoded message. In this embodiment of the invention, the sender A at station 205 introduces his PIN$_A$, identifies himself and his intended receiver B at location 209, and also introduces a SEQ. NO. (such as date and time), all via keyboard means 211 which may contain a full complement of 26 letters and 10 digits for convenient encoding of textual messages. In addition, sender A introduces his message to be encoded for secure transmission over the data link 203 to the central station 213 for further processing.

At the initiating station 205, the keyboard means 211 may contain conventional, addressable buffer registers for selecting the portions of input information introduced via the keyboard keys for separate treatment and routing. Thus, for a National Bureau of Standards encryption module 207 of the type previously described, the keyboard means 211 may supply two separate inputs to the module 207 in the format illustrated (or in other suitable sets of the input information, as desired) and may also supply the identity of A and B (and optionally the sequence number) in clear text. The module 207, operating on the signals applied to it, produces an encoded message 215 which can be sent along the identity information about A and B over data link 203 of any type, as previously described, to the central station 213. There, the received encoded message 215 is decoded using information about the sender A that is on file and is then reencrypted for retransmission using information about receiver B which is also on file. Specifically, the received information 206 (in clear text usually) which identifies the sender A enables the encoded PIN for sender A and the encrypted key therefor to be withdrawn from file 219 for decoding using the encrypted key, as previously described, to produce PIN$_A$ (internally only) that is then used to decrypt the received message 215 in encryption module 217. Once decrypted (and available internally only), the message may now be reencrypted using the PIN$_B$ for the receiver B. The PIN$_B$ may be reproduced (available internally only) by decrypting the encrypted PIN$_B$ and the encrypted key$_B$ therefor applied to encryption module 217 in the manner previously described to produce the PIN$_B$ for reencrypting the message that was decrypted using the PIN$_A$. Thus, the encrypted message 221 that is transmitted via data link 223 to station 209 along with the information 206 about the sender A and the receiver B is newly encrypted with respect to the identity of the intended receiver B.

At the remote station 209, the received encrypted message 221 and the received information 206 about the sender A and receiver B may be decoded under B's control the yield the encoded message in clear text. Specifically, the receiver B need only enter his PIN via keyboard means 225 for combining with the received sequence number, and the like, to provide the input signal in requisite format to apply to the encryption module 227. The key for decrypting the received encrypted message 211 is thus supplied by B himself to operate the module 227 according to the inverse of the algorithm by which module 217 reencrypted the message. Of course, TRAC signals and ACK-TRAC signals may be furnished and transmitted along with the encoded messages in the manner previously described. However, in this application where an entire memo or letter is being encoded, for example, in electronic mail transmission, the entire memo will either decode or not decode depending upon whether error or tampering occurred in transmission, or upon whether unauthorized persons attempted to transmit or decode messages within this system embodiment of the present invention. Thus, a "scrambled" memo remaining after an attempted decryption by receiver B at station 209 indicates that error or alteration occurred during transmission or that unauthorized persons other than those whose encrypted PIN's and encrypted keys are on file at station 213 attempted to transmit or decode the memo.

It should be noted that for enhanced security or control, two or more individuals, each having a PIN that is stored remotely in encrypted form along with the encryption keys therefor, may combine their PIN's to produce a composite TRAC signal, for example, as described in connection with FIG. 5A, that can then be compared with a TRAC signal regenerated from the two PIN's and encryption keys therefor stored in the remote file. The rest of the acknowledgment message may proceed as described in connection with FIG. 5A.

Referring now to FIGS. 12 and 13, the illustrated embodiment of the present invention facilitates the secured telephone authorization to pay bills, execute an order, etc. In this embodiment, a central office or TRAC center 231 can be contacted by a user 233 via telephone hookup. The user merely conveys his or her PIN without offering any other information. That PIN, as received at the TRAC center, is combined in encoding module 235 (of the NBS type, or the like previously described) with a sequence number from generator 237 to produce a TRAC code 239 according to the logical encoding of the two number signals in the manner previously described. The TRAC code 239 and the sequence number that was used to generate such TRAC code can then be conveyed back to the user via the telephone hookup. The TRAC center 231 does not have to know the identity of the person whose PIN it receives, and need only supply a sequence number (e.g., date, sequence number, coding signals for the day from the disbursement center or bank 241, etc.) to the encoding module 235 for completion of its operation.

The user 233 now has the information necessary to complete his telephone orders via the disbursement center, or bank, 241.

The user may now contact the disbursement center or bank 241, for example, via telephone hookup, and furnish directions for paying bills, executing orders, etc., as his message (MSGE) and secure such directions by also furnishing his name (or other identification such as account number, etc., which is associated with the PIN in file 245) and the TRAC code and sequence number that he received from the TRAC center 231. The disbursement center 241 operates on the information received from the user by retrieving from the file 245 the PIN which is associated with the user's name or other identification, and by applying the PIN received from file 245 and the sequence number received from the user to the encoding module 247. This module operates in accordance with the same logical encoding scheme as the module 235 in the TRAC center 231 to produce a TRAC code from the PIN and sequence number applied thereto. The TRAC code thus generated and the TRAC code received from the user 233 are compared in comparator 249 which produces an enabling output 251 upon detecting parity of TRAC codes applied thereto. The enabling signal signifies an authorized user 233 and enables gate 253 to signal the authorized completion of the directions or message MSGE received from the user 233.

In this manner, a user 233 may preserve his identity and the security of his PIN by revealing only portions of the requisite information at a time, while nevertheless being able to complete telephone transactions with a high degree of security against unauthorized manipulation of his account or MSGE, or the like.

In each of the embodiments above, additional information such as a MSGE or DATA signal may always be sent to the remote location along with the TRAC signal(s) transmitted. Such MSGE or DATA signals may identify the first number of characters of one input of an encryption module that represent the number of bits in the PIN, or the like. Also, it should be understood that in each of the embodiments of the present invention described above sequential numbers may be used in place of random numbers used in the identification or encoding schemes, or random numbers may be used in place of sequential numbers. This permits the systems to exclude the repeating of the same data or information in subsequent transactions by enabling a check for parity of either random or sequential numbers at the receiving stations. Also, as used herein, "individual" may refer to a person or an institution such as a correspondent bank, or the like.

Therefore, the present invention may operate without paired modules at remote ends of a data transmission link, provided, of course, that encryption modules of similar type and operable according to the identical algorithm are contained in each location. Then, the secret PIN of an individual remains secret at the entry point (and is either stored in encrypted form or regenerated internally only elsewhere in the system). This facilitates the convenient generation of a TRAC signal, for example, by a simple calculator-type device containing an encryption module, and this TRAC signal may then be openly communicated to the remote location by telephone, telegram, etc., along with the transaction message or data, all without possibility of unauthorized alteration. Such a user's device may simply calculate a TRAC number for all the data, PIN and SEQ. NO. supplied, and this TRAC number becomes that user's unique signature for that single transaction. Audit records pertaining to all such transactions are therefore amply available and more readily recallable than the microfilmed records of paper transactions currently in use.

Further, the calculation of the TRAC code or number may be segregated from the rest of the secured transaction for completion at a TRAC center which may be contacted via unsecured mail, telephone hookup, or the like. With the TRAC code thus established, a user may then consummate a secured transaction through a disbursement center, or bank using such unsecured links as mail, telephone hookup, or the like. Also, it should be understood that a telephone hookup between locations, or between a user and a location, as described herein, may include voice-communicated code information or "touch-tone" communicated code information.

I claim:

1. Apparatus for completing a secured transaction at a remote location using unsecured communication channels and identification information signals about a user stored at the remote location, the apparatus comprising:

a first encoding means and a second encoding means at the remote location, each of the coding means having a pair of inputs and each being operable to produce a coded output signal in accordance with the same logical combination of signals applied to the respective inputs thereof;

first means for supplying an independently-generated coding number signal to one input of the first encoding means;

second means for applying the identification information signal from the user to the other input of the first encoding means for producing a first coded output signal therefrom;

third means for supplying to the user both said first coded output signal and the coding number signal applied to said one input;

fourth means for selectively applying the stored identification information signal to an input of the second encoding means at the remote location;

fifth means under control of the user for supplying said coding number signal to the other input of the second encoding means for producing a second coded output signal therefrom;

comparator means coupled to receive the second coded output signal from the second encoding means and another coded output signal for producing an enabling output signal in response to parity of coded output signals applied thereto to indicate authorization to complete the transaction with respect to the user;

sixth means under control of the user for applying said first coded output signal to said comparator means; and at least one of the second, third, fifth and sixth means includes a communication channel.

2. The method of completing a secured transaction at a remote location using unsecured communication channels and identification information about a user stored at the remote location, the method comprising:

generating a coding signal with respect to the transaction;

producing a first coded output signal in response to a logical combination of the generated coding signal and the identification information supplied by the user;

communicating to the user the first coded output signal and the coding signal used to produce said first coded output signal;

communicating the coding signal to the remote location under control of the user;

producing a second coded output signal in accordance with said logical combination of the stored identification information about the user and the coding signal supplied by the user;

communicating the first coded output signal to the remote location under control of the user; and comparing said first and second coded output signals to provide an indication of authorization to complete the transaction with respect to said user.

* * * * *